(12) United States Patent
Horie et al.

(10) Patent No.: US 11,811,023 B2
(45) Date of Patent: Nov. 7, 2023

(54) LITHIUM ION ASSEMBLED BATTERY

(71) Applicant: APB Corporation, Tokyo (JP)

(72) Inventors: Hideaki Horie, Tokyo (JP); Shun Kudoh, Kyoto (JP); Ryosuke Kusano, Kyoto (JP); Yasuhiro Tsudo, Kyoto (JP)

(73) Assignee: APB Corporation, Tokyo (JP)

( * ) Notice: Subject to any disclaimer, the term of this patent is extended or adjusted under 35 U.S.C. 154(b) by 0 days.

(21) Appl. No.: 17/777,518

(22) PCT Filed: Nov. 18, 2020

(86) PCT No.: PCT/JP2020/042902
§ 371 (c)(1),
(2) Date: May 17, 2022

(87) PCT Pub. No.: WO2021/100736
PCT Pub. Date: May 27, 2021

(65) Prior Publication Data
US 2023/0053222 A1     Feb. 16, 2023

(30) Foreign Application Priority Data

Nov. 18, 2019    (JP) ................................ 2019-208300

(51) Int. Cl.
*H01M 10/0585*     (2010.01)
*H01M 50/204*     (2021.01)
(Continued)

(52) U.S. Cl.
CPC ....... *H01M 10/0585* (2013.01); *H01M 4/661* (2013.01); *H01M 4/667* (2013.01);
(Continued)

(58) Field of Classification Search
CPC .. H01M 10/0585; H01M 4/661; H01M 4/667; H01M 4/668; H01M 10/0525; H01M 50/204; H01M 2004/021
(Continued)

(56) References Cited

U.S. PATENT DOCUMENTS

2014/0147746 A1    5/2014   Tanaka
2019/0067680 A1*   2/2019   Ohsawa .................. H01M 4/66
(Continued)

FOREIGN PATENT DOCUMENTS

JP       2010092664     4/2010
JP       2010176987     8/2010
(Continued)

OTHER PUBLICATIONS

Applicant's Response to Written Opinion in PCT/JP2020/042902 submitted Sep. 17, 2021 (machine translation).
(Continued)

*Primary Examiner* — Gary D Harris
(74) *Attorney, Agent, or Firm* — Suzannah K. Sundby, Esq.; Canady + Lortz LLP (57) ABSTRACT

Provided is a lithium-ion assembled battery in which two or more single cells are laminated and the DC resistance value between the single cells is low. The assembled battery has two or more single cells including a laminating unit in which a positive electrode current collector, a positive electrode active material layer, a separator, a negative electrode active material layer, and a negative electrode current collector are laminated in order, in the assembled battery, one single cell and the other single cell are laminated such that the positive electrode current collector of the one single cell and the negative electrode current collector of the other single cell are in contact with each other, the positive electrode current collector is made up of a conductive resin layer containing
(Continued)

a polyolefin resin (A1) and a conductive carbon filler (B1), the negative electrode current collector is made up of two or more kinds of conductive layers, and the conductive layer disposed on an outer side among the conductive layers in the negative electrode current collector contains the polyolefin resin (A1) and the conductive carbon filler (B1).

4 Claims, 1 Drawing Sheet

(51) Int. Cl.
  *H01M 4/66* (2006.01)
  *H01M 10/0525* (2010.01)
  *H01M 4/02* (2006.01)
(52) U.S. Cl.
  CPC ....... *H01M 4/668* (2013.01); *H01M 10/0525* (2013.01); *H01M 50/204* (2021.01); *H01M 2004/021* (2013.01)
(58) Field of Classification Search
  USPC .......................................................... 429/152
  See application file for complete search history.

(56) References Cited

U.S. PATENT DOCUMENTS

| | | | |
|---|---|---|---|
| 2020/0243867 A1 | 7/2020 | Kusano | |
| 2021/0257625 A1* | 8/2021 | Ikeda | .................... H01M 4/663 |

FOREIGN PATENT DOCUMENTS

| | | |
|---|---|---|
| JP | 2011054492 | 3/2011 |
| JP | 2013026192 | 2/2013 |
| JP | 2017045530 | 3/2017 |
| WO | 2013015159 | 1/2013 |
| WO | 2019078160 | 4/2019 |

OTHER PUBLICATIONS

International Preliminary Report on Patentability received in PCT/JP2020/042902 dated Jan. 11, 2022 (machine translation).
International Search Report received in PCT/JP2020/042902 dated Jan. 19, 2021 (machine translation).
Written Opinion received in PCT/JP2020/042902 dated Jan. 19, 2021 (machine translation).

* cited by examiner

LITHIUM ION ASSEMBLED BATTERY

TECHNICAL FIELD

The present invention relates to a lithium-ion assembled battery.

BACKGROUND ART

Lithium-ion batteries have characteristics of a high voltage and a high energy density and thus have been in wide use in various applications in recent years. Studies are also underway to apply lithium-ion batteries to hybrid vehicles, electric vehicles, and the like, and there is a demand for an additional increase in the capacity and output of secondary batteries for practical use.

Generally, a lithium-ion assembled battery has two or more single cells including a laminating unit in which a positive electrode current collector, a positive electrode active material layer, a separator, a negative electrode active material layer, and a negative electrode current collector are laminated in order.

As such a lithium-ion assembled battery formed by laminating two or more single cells, a lithium-ion assembled battery in which a resin current collector is used as a current collector has been proposed for the purpose of improving the output per unit weight of the battery. However, in a case where a resin current collector is used in a single cell, since the resin current collector has a lower electron fluidity than metal current collectors, there is a tendency that the conductivity is low and the electric resistance between the laminated single cells becomes high. As a method for solving this problem, studies have been underway regarding a method in which two or more single cells are housed in a flexible container and the inside of the container is degassed and then sealed, thereby attaching the resin current collectors in vertically adjacent single cells to each other or the like (refer to PTL 1).

CITATION LIST

Patent Literature

[PTL 1] Japanese Unexamined Patent Publication No. 2017-45530

SUMMARY OF INVENTION

Technical Problem

However, the electric resistance between the single cells cannot be said to be sufficiently low, and it can be said that additional reduction in resistance is required.

An object of the present invention is to provide a lithium-ion assembled battery in which two or more single cells are laminated and the electric resistance value between the single cells is low.

Solution to Problem

The present inventors attained the present invention as a result of intensive studies for solving this problem. That is, the present invention is an assembled battery having two or more single cells including a laminating unit in which a positive electrode current collector, a positive electrode active material layer, a separator, a negative electrode active material layer, and a negative electrode current collector are laminated in order, in which, in the assembled battery, one single cell and the other single cell are laminated such that the positive electrode current collector of the one single cell and the negative electrode current collector of the other single cell are in contact with each other, the positive electrode current collector is made up of a conductive resin layer containing a polyolefin resin (A1) and a conductive carbon filler (B1), the negative electrode current collector is made up of two or more kinds of conductive layers, and the conductive layer disposed on an outer side among the conductive layers in the negative electrode current collector contains the polyolefin resin (A1) and the conductive carbon filler (B1).

Advantageous Effects of Invention

According to the present invention, it is possible to obtain a lithium-ion assembled battery in which two or more single cells are laminated and the DC resistance value of the assembled battery is low.

DESCRIPTION OF EMBODIMENTS

Hereinafter, the present invention will be described in detail.

Figure 1:
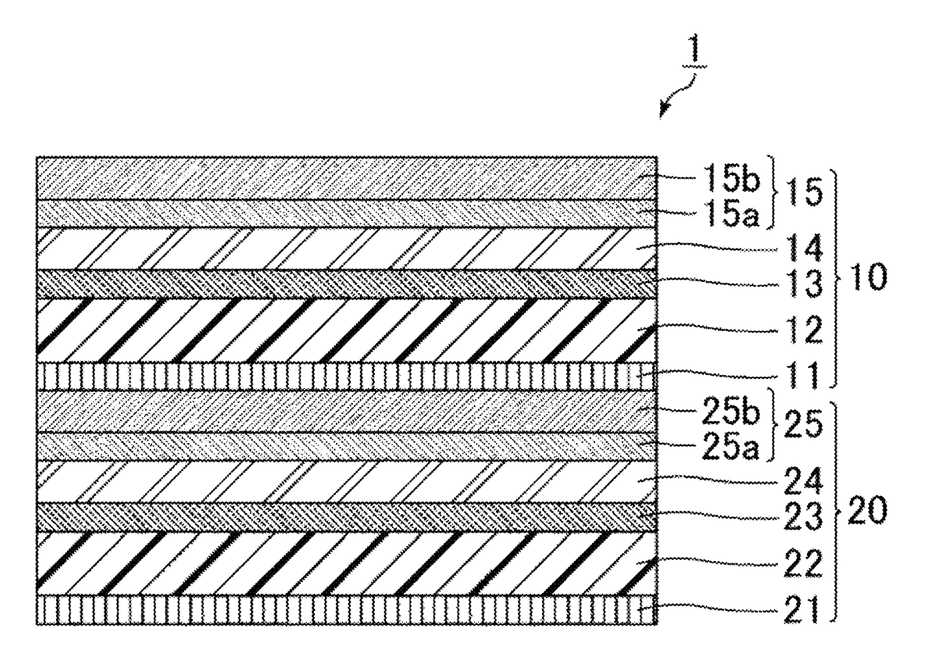
FIG. 1 is a cross-sectional view schematically showing an example of a lithium-ion assembled battery of the present invention.

FIG. 1 is a cross-sectional view schematically showing an example of a lithium-ion assembled battery of the present invention.

As shown in FIG. 1, a lithium-ion assembled battery 1 is made up of a first single cell 10 in which a positive electrode current collector 11, a positive electrode active material layer 12, a separator 13, a negative electrode active material layer 14, and a negative electrode current collector 15 are laminated in order and a second single cell 20 in which a positive electrode current collector 21, a positive electrode active material layer 22, a separator 23, a negative electrode active material layer 24, and a negative electrode current collector 25 are laminated in order.

In the lithium-ion assembled battery 1, the first single cell 10 and the second single cell 20 are preferably made of the same constituent material.

That is, a constituent material of the positive electrode current collector 11, the positive electrode active material layer 12, the separator 13, the negative electrode active material layer 14, and the negative electrode current collector 15 and a constituent material of the positive electrode current collector 21, the positive electrode active material layer 22, the separator 23, the negative electrode active material layer 24, and the negative electrode current collector 25 are preferably the same as each other.

In the lithium-ion assembled battery 1, the first single cell 10 and the second single cell 20 are laminated such that the positive electrode current collector 11 of the first single cell 10 and the negative electrode current collector 25 of the second single cell 20 are in contact with each other. That is, the first single cell 10 and the second single cell 20 are connected to each other in series.

In addition, the negative electrode current collector 15 of the first single cell 10 is made up of two kinds of conductive layers of a conductive layer 15a disposed on the inner side and a conductive layer 15b disposed on the outer side.

In addition, the negative electrode current collector 25 of the second single cell 20 is made up of two kinds of conductive layers of a conductive layer 25a disposed on the inner side and a conductive layer 25b disposed on the outer side.

Each constitution of the lithium-ion assembled battery will be described below.

In the lithium-ion assembled battery 1, the positive electrode current collector 11 and the positive electrode current collector 21 are each made up of a conductive resin layer containing a polyolefin resin (A1) and a conductive carbon filler (B1).

Examples of the polyolefin resin (A1) include polyethylene, polypropylene, polymethylpentene, polycycloolefin, polyethylene terephthalate, polyether nitrile, polytetrafluoroethylene, styrene butadiene rubber, polyacrylonitrile, polymethyl acrylate, polymethyl methacrylate, polyvinylidene fluoride, epoxy resins, silicone resins, mixtures thereof, and the like, but are not limited thereto.

From the viewpoint of electric stability, polyethylene, polypropylene, polymethylpentene and polycycloolefin are preferable, and polyethylene, polypropylene and polymethylpentene are more preferable.

As the polyolefin resin (A1), for example, the followings can be procured from the market.

Polyethylene: "NOVATEC LL UE320" and "NOVATEC LL UJ960", both manufactured by Japan Polyethylene Corporation Polypropylene: "SUNALLOMER PM854X", "SUNALLOMER PC684S", "SUNALLOMER PL500A", "SUNALLOMER PC630S", "SUNALLOMER PC630A", and "SUNALLOMER PB522M" all manufactured by SunAllomer Ltd., "PRIME POLYPRO J-2000GP" manufactured by Prime Polymer Co., Ltd., "WINTEC WFX4T" manufactured by Japan Polypropylene Corporation Polymethylpentene: "TPX" manufactured by Mitsui Fine Chemicals, Inc Co., Ltd.

Examples of the conductive carbon filler (B1) include graphite, carbon black (acetylene black, ketjen black, furnace black, channel black, thermal lamp black, and the like), mixtures thereof, and the like, but are not limited thereto.

In the lithium-ion assembled battery of the present invention, the specific surface area of the conductive carbon filler (B1) is preferably 35 $m^2/g$ or less and preferably 10 to 32 $m^2/g$ from the viewpoint of the durability of the positive electrode current collector.

As the conductive carbon filler (B1), for example, the followings can be procured from the market.

Trade names "UP20N (3.33 $m^2/g$)", "CGB20 (4.72 $m^2/g$)", "CPB (6.95 $m^2/g$)" [manufactured by Nippon Graphite Industries, Co., Ltd.], "SG-BH (4.84 $m^2/g$)", "SG-BL30 (4.28 $m^2/g$)", "SG-BL40 (3.19 $m^2/g$)", "RP99-150 (5.13 $m^2/g$)", "PC99-300M (3.87 $m^2/g$)", "SRP-150 (5.61 $m^2/g$)", "PC-30 (6.04 $m^2/g$)" [all manufactured by Ito Graphite Co., Ltd.], trade names "SNG-WXA1 (1.8 $m^2/g$)", "SNGP1A1 (0.6 $m^2/g$)" [both manufactured by JFE Chemical Corporation], trade name "#3030 (32 $m^2/g$)" [manufactured by Mitsubishi Chemical Corporation], trade name "ENSACO 250G in a granular form (68 $m^2/g$)" [manufactured by Imerys], trade names "DENKA BLACK (69 $m^2/g$)", and "DENKA BLACK Li-400 (39 $m^2/g$)" [manufactured by Denka Company Limited].

The values shown in the parentheses after the trade names are the specific surface areas of the fillers.

The weight proportion of the conductive carbon filler (B1) in the positive electrode current collector in the lithium-ion assembled battery is preferably 15 to 35% by weight and more preferably 20 to 30% by weight based on the weight of the positive electrode current collector from the viewpoint of the electric characteristics and moldability of the current collector.

In the lithium-ion assembled battery 1, the negative electrode current collector 15 and the negative electrode current collector 25 are each made up of two kinds of conductive layers, that is, the conductive layer 15a and the conductive layer 25a disposed on the inner side of each single cell and the conductive layer 15b and the conductive layer 25b disposed on the outer side of each single cell, respectively.

The conductive layer 15a and the conductive layer 25a disposed on the inner side are not particularly limited, but preferably contain a polyolefin resin and a conductive filler. As the polyolefin resin, those listed as the polyolefin resin (A1) are preferable, and, as the conductive filler, nickel, aluminum, stainless steel, carbon, silver, copper, titanium, and mixtures thereof are preferable.

The conductive layer 15b and the conductive layer 25b disposed on the outer side contain a polyolefin resin (A1) and a conductive carbon filler (B1).

Examples of the polyolefin resin (A1) and the conductive carbon filler (B1) include those described above. The polyolefin resin (A1) and the conductive carbon filler (B1) contained in a conductive layer in contact with the positive electrode current collector of the other single cell in the laminate are a polyolefin resin and a conductive carbon filler having the same composition as the polyolefin resin (A1) and the conductive carbon filler (B1) in the positive electrode current collector.

The weight proportion of the conductive carbon filler (B1) in the conductive layer 15b and the conductive layer 25b is preferably 15 to 35% by weight and more preferably 20 to 30% by weight based on the weight of the conductive layer from the viewpoint of the electric characteristics and moldability of the current collector.

The weight proportion of the conductive carbon filler (B1) in the conductive layer may be the same as or different from the weight proportion of the conductive carbon filler (B1) in the positive electrode current collector.

In the lithium-ion assembled battery 1, the positive electrode current collector 11 and the positive electrode current collector 21 may further contain, in addition to the polyolefin resin (A1) and the conductive carbon filler (B1), other components such as a dispersant for a conductive material, a colorant, an ultraviolet absorber, and a general-purpose plasticizer (a phthalic acid skeleton-containing compound, a trimellitic acid skeleton-containing compound, a phosphate group-containing compound, an epoxy skeleton-containing compound, or the like) appropriately as necessary. This is also true for the conductive layer 15b of the negative electrode current collector 15 and the conductive layer 25b of the negative electrode current collector 25.

From the viewpoint of electric stability, the total amount of the other components added is preferably 0.001 to 5% by weight and more preferably 0.001 to 3% by weight based on the weight of the positive electrode current collector or the negative electrode current collector.

One surface of the current collector may be covered with a metal layer.

The positive electrode active material layer 12 and the positive electrode active material layer 22 of the lithium-ion assembled battery 1 contain a positive electrode active material.

Examples of the positive electrode active material include composite oxides of lithium and a transition metal {composite oxides containing one kind of transition metal ($LiCoO_2$, $LiNiO_2$, $LiAlMnO_4$, $LiMnO_2$, $LiMn_2O_4$, and the like), composite oxides containing two kinds of transition metal elements (for example, $LiFeMnO_4$, $LiNi_{1-x}Co_xO_2$, $LiMn_{1-y}Co_yO_2$, $LiNi_{1/3}CO_{1/3}Al_{1/3}O_2$, and $LiNi_{0.8}Co_{0.15}Al_{0.05}O_2$) composite oxides containing three or more kinds of metal elements [for example, $LiM_aM'_bM''_cO_2$ (M, M', and M'' are different transition metal elements from one another and satisfy a+b+c=1. For example, $LiNi_{1/3}Mn_{1/3}Co_{1/3}O_2$), and the like], and the like}, lithium-containing transition metal phosphates (for example, $LiFePO_4$, $LiCoPO_4$, $LiMnPO_4$ and $LiNiPO_4$), transition metal oxides (for example, $MnO_2$ and $V_2O_5$), transition metal sulfides (for example, $MoS_2$ and $TiS_2$), conductive polymers (for example, polyaniline, polypyrrole, polythiophene, polyacetylene, poly-p-phenylene, and polyvinylcarbazole), and the like, and two or more kinds thereof may be jointly used.

The lithium-containing transition metal phosphate may be a lithium-containing transition metal phosphate in which a part of the transition metal sites is substituted with other transition metals.

The positive electrode active material is preferably a coated positive electrode active material coated with a coating resin containing a conductive auxiliary agent.

When the periphery of the positive electrode active material is coated with the coating resin, the volume change of the electrode is alleviated, and the expansion of the electrode can be suppressed.

Examples of the conductive auxiliary agent include metal-based conductive auxiliary agents [aluminum, stainless steel (SUS), silver, gold, copper, titanium, and the like], carbon-based conductive auxiliary agents [graphite and carbon black (acetylene black, ketjen black, furnace black, channel black, thermal lamp black, and the like), and the like] mixtures thereof, and the like.

These conductive auxiliary agents may be used singly or two or more kinds thereof may be jointly used. In addition, these conductive auxiliary agents may also be used as an alloy or metal oxide thereof.

Among them, from the viewpoint of electric stability, aluminum, stainless steel, silver, gold, copper, titanium, carbon-based conductive auxiliary agents, and mixtures thereof are more preferable, silver, gold, aluminum, stainless steel, and carbon-based conductive auxiliary agents are still more preferable, and carbon-based conductive auxiliary agents are particularly preferable.

In addition, these conductive auxiliary agents may be a conductive auxiliary agent formed by coating the periphery of a particle-based ceramic material or resin material with a conductive material by plating or the like. As the conductive material, aluminum, stainless steel (SUS), silver, gold, copper, titanium, and the like are preferable.

The shape (form) of the conductive auxiliary agent is not limited to a particle form and may be a form other than the particle form or may be a form that is being practically used as a so-called filler-based conductive auxiliary agent such as a carbon nanofiber or a carbon nanotube.

The ratio between the coating resin and the conductive auxiliary agent is not particularly limited; however, from the viewpoint of the internal resistance of the battery and the like, the weight ratio of the coating resin (the weight of the resin solid content) and the conductive auxiliary agent is preferably 1:0.01 to 1:50 and more preferably 1:0.2 to 1:3.0.

As the coating resin, those described as a non-aqueous secondary battery active material coating resin in Japanese Unexamined Patent Publication No. 2017-054703 can be suitably used.

In addition, the positive electrode active material layer 12 and the positive electrode active material layer 22 may contain a conductive auxiliary agent in addition to the conductive auxiliary agent that is contained in the coating resin.

Examples of the conductive auxiliary agent include metal-based conductive auxiliary agents [aluminum, stainless steel (SUS), silver, gold, copper, titanium, and the like], carbon-based conductive auxiliary agents [graphite and carbon black (acetylene black, ketjen black, furnace black, channel black, thermal lamp black, and the like), and the like] mixtures thereof, and the like.

These conductive auxiliary agents may be used singly or two or more kinds thereof may be jointly used. In addition, these conductive auxiliary agents may also be used as an alloy or metal oxide thereof.

Among them, from the viewpoint of electric stability, aluminum, stainless steel, silver, gold, copper, titanium, carbon-based conductive auxiliary agents, and mixtures thereof are more preferable, silver, gold, aluminum, stainless steel, and carbon-based conductive auxiliary agents are still more preferable, and carbon-based conductive auxiliary agents are particularly preferable.

In addition, these conductive auxiliary agents may be a conductive auxiliary agent formed by coating the periphery of a particle-based ceramic material or resin material with a conductive material by plating or the like. As the conductive material, aluminum, stainless steel (SUS), silver, gold, copper, titanium, and the like are preferable.

The positive electrode active material layer 12 and the positive electrode active material layer 22 are preferably unbound bodies that contain the positive electrode active material and do not contain any binding materials which bind the positive electrode active materials to each other.

Here, the unbound body means that the position of the positive electrode active material is not fixed by the binding material (also referred to as a binder) and the positive electrode active materials and the positive electrode active material and the current collector are not irreversibly fixed to each other.

The positive electrode active material layer 12 and the positive electrode active material layer 22 may contain a pressure-sensitive adhesive resin.

As the pressure-sensitive adhesive resin, for example, a pressure-sensitive adhesive resin having a glass transition temperature adjusted to room temperature or lower by mixing a small amount of an organic solvent with a non-aqueous secondary battery active material coating resin described in Japanese Unexamined Patent Publication No. 2017-054703, a pressure-sensitive adhesive resin described as a pressure-sensitive adhesive in Japanese Unexamined Patent Publication No. H10-255805, or the like can be suitably used.

The pressure-sensitive adhesive resin means a resin that is not solidified and remains as pressure-sensitive adhesive even after dried by volatilizing a solvent component (a property of adhering by the application of a weak pressure without using water, a solvent, heat, or the like). On the other hand, a solution drying-type electrode binder that is used as a binding material means a binder that is dried and solidified by volatilizing a solvent component to strongly adhere and be fixed to active materials.

Therefore, the solution drying-type electrode binder (binding material) and the pressure-sensitive adhesive resin are different materials.

The thicknesses of the positive electrode active material layer 12 and the positive electrode active material layer 22 are not particularly limited, but are preferably 150 to 600 μm and more preferably 200 to 450 μm from the viewpoint of battery performance.

The negative electrode active material layer 14 and the negative electrode active material layer 24 of the lithium-ion assembled battery 1 contain a negative electrode active material.

As the negative electrode active material, a well-known negative electrode active material for lithium-ion batteries can be used, and examples thereof include carbon-based materials, silicon-based materials, conductive polymers (for example, polyacetylene, polypyrrole, and the like), metals (tin, aluminum, zirconium, titanium, and the like), metal oxides (titanium oxides, lithium-titanium oxides, and the like), metal alloys (for example, lithium-tin alloys, lithium-aluminum alloys, lithium-aluminum-manganese alloys, and the like), and the like, mixtures of the above-described negative electrode active material and a carbon-based material, and the like.

Examples of the carbon-based materials include graphite, non-graphitizable carbon, amorphous carbon, fired resin bodies (for example, carbonized substances obtained by firing a phenol resin, a furan resin, or the like and the like), cokes (for example, pitch coke, needle coke, petroleum coke, and the like), carbon fibers, and the like.

Examples of the silicon-based materials include silicon, silicon oxides (SiOx), silicon-carbon composites (composites obtained by coating the surfaces of carbon particles with silicon and/or silicon carbide, composites obtained by coating the surfaces of silicon particles or silicon oxide particles with carbon and/or silicon carbide, silicon carbide, and the like), silicon alloys (silicon-aluminum alloys, silicon-lithium alloys, silicon-nickel alloys, silicon-iron alloys, silicon-titanium alloys, silicon-manganese alloys, silicon-copper alloys, silicon-tin alloys, and the like), and the like.

In addition, the negative electrode active material may be, similar to the above-described coated positive electrode active material, a coated negative electrode active material coated with a coating resin containing a conductive auxiliary agent.

A suitable material for the coating resin containing a conductive auxiliary agent that coats the negative electrode active material is the same as the suitable material for the coating resin that coats the positive electrode active material. This is also true for the conductive auxiliary agent.

In addition, the negative electrode active material layer 14 and the negative electrode active material layer 24 may contain a conductive auxiliary agent in addition to the conductive auxiliary agent that is contained in the coating resin. As the conductive auxiliary agent, the same conductive auxiliary agent as the conductive auxiliary agent that is contained in the above-described coating resin can be suitably used.

Similar to the positive electrode active material layer 12 and the positive electrode active material layer 22, the negative electrode active material layer 14 and the negative electrode active material layer 24 are preferably unbound bodies not containing any binding materials which bind the negative electrode active materials to each other. In addition, similar to the positive electrode active material layer, the negative electrode active material layer may contain a pressure-sensitive adhesive resin.

The thicknesses of the negative electrode active material layer 14 and the negative electrode active material layer 24 are not particularly limited, but are preferably 150 to 600 μm and more preferably 200 to 450 μm from the viewpoint of battery performance.

Examples of the separator 13 and the separator 23 include well-known separators for lithium-ion batteries such as porous films made of polyethylene or polypropylene, laminate films of a porous polyethylene film and a porous polypropylene film, non-woven fabric made of a synthetic fiber (a polyester fiber, an aramid fiber, or the like) or a glass fiber, and separators having fine ceramic particles such as silica, alumina, or titania attached to the surface thereof.

An electrolytic solution is contained in the positive electrode active material layer 12, the positive electrode active material layer 22, the negative electrode active material layer 14, and the negative electrode active material layer 24.

As the electrolytic solution, a well-known electrolytic solution containing an electrolyte and a non-aqueous solvent that is used for the manufacturing of a well-known lithium-ion battery can be used.

As the electrolyte, electrolytes that are used in well-known electrolytic solutions can be used, and examples thereof include lithium salts of an inorganic acid such as $LiN(FSO_2)_2$, $LiPF_6$, $LiBF_4$, $LiSbF_6$, $LiAsF_6$, and $LiClO_4$, lithium salts of an organic acid such as $LiN(CF_3SO_2)_2$, $LiN(C_2F_5SO_2)_2$, and $LiC(CF_3SO_2)_3$, and the like. Among these, imide-based electrolytes [$LiN(FSO_2)_2$, $LiN(CF_3SO_2)_2$, $LiN(C_2F_5SO_2)_2$, and the like] and $LiPF_6$ are preferable from the viewpoint of the battery output and the charge/discharge cycle characteristics.

As the non-aqueous solvent, non-aqueous solvents that are used in well-known electrolytic solutions can be used, and examples thereof include a lactone compound, a cyclic or chain-like carbonate ester, a chain-like carboxylic acid ester, a cyclic or chain-like ether, a phosphoric acid ester, a nitrile compound, an amide compound, a sulfone, a sulfolane, and the like and mixtures thereof can be used.

The electrolyte concentration of the electrolytic solution is preferably 1 to 5 mol/L, more preferably 1.5 to 4 mol/L, and still more preferably 2 to 3 mol/L.

When the electrolyte concentration of the electrolytic solution is less than 1 mol/L, there is a case where sufficient input/output characteristics of batteries cannot be obtained, and, when the electrolyte concentration exceeds 5 mol/L, there is a case where the electrolyte is precipitated.

The electrolyte concentration of the electrolytic solution can be confirmed by extracting the electrolytic solution that configures electrodes for lithium-ion batteries or lithium-ion batteries without using a solvent or the like and measuring the concentration thereof.

In the lithium-ion assembled battery 1, the periphery of the first single cell 10 may be sealed with a sealing material such that the positive electrode current collector 11 and the negative electrode current collector 15 are exposed. In addition, the periphery of the second single cell 20 may be sealed with a sealing material such that the positive electrode current collector 21 and the negative electrode current collector 25 are exposed.

The lithium-ion assembled battery 1 is a lithium-ion assembled battery in which two single cells, that is, the first single cell 10 and the second single cell 20 are laminated, but the lithium-ion assembled battery may be configured by laminating three or more single cells.

EXAMPLE

Next, the present invention will be specifically described using examples, but the present invention is not limited to the examples within the scope of the gist of the present invention. Unless particularly otherwise described, "parts" mean "parts by weight" and "%" means "% by weight".

Manufacturing Example 1: Manufacture of Positive Electrode Current Collector (P1)

With a twin-screw extruder, 70 parts of polypropylene [trade name "SUNALLOMER PC684S", manufactured by SunAllomer Ltd.], 25 parts of carbon black [trade name "ENSACO 250G in a granular form (specific surface area: 68 $m^2/g$)", manufactured by Imerys], and 5 parts of a dispersant [trade name "UMEX 1001", manufactured by Sanyo Chemical Industries, Ltd.] were melted and kneaded under conditions of 180° C., 100 rpm, and a residence time of 5 minutes to obtain a resin current collector material for a positive electrode. The obtained resin current collector material for a positive electrode was rolled with a hot press, thereby obtaining a positive electrode current collector (P1) having a film thickness of 100 μm.

Manufacturing Example 2: Manufacturing of Positive Electrode Current Collector (P2)

The same operation as in Manufacturing Example 1 was performed except that the carbon black in Manufacturing Example 1 was changed to trade name "#3030 (specific surface area: 32 $m^2/g$)" (manufactured by Mitsubishi Chemical Corporation), thereby obtaining a positive electrode current collector (P2) having a film thickness of 100 μm.

Manufacturing Example 3: Manufacturing of Positive Electrode Current Collector (P3)

The same operation as in Manufacturing Example 1 was performed except that the carbon black in Manufacturing Example 1 was changed to trade name "DENKA BLACK (specific surface area: 69 $m^2/g$)" (manufactured by Denka Company Limited), thereby obtaining a positive electrode current collector (P3) having a film thickness of 100 μm.

Manufacturing Example 4: Manufacturing of Negative Electrode Current Collector (N1)

With a twin-screw extruder, 30 parts of polypropylene [trade name "SUNALLOMER PC684S", manufactured by SunAllomer Ltd.], 67 parts of nickel particles [trade name "Nickel Powder Type 255", manufactured by Vale], and 3 parts of a dispersant [trade name "UMEX 1001", manufactured by Sanyo Chemical Industries, Ltd.] were melted and kneaded under conditions of 180° C., 100 rpm, and a residence time of 5 minutes to obtain a resin current collector material for a negative electrode. The obtained resin current collector material for a negative electrode was rolled with a hot press, thereby obtaining a conductive layer (N1-1) having a film thickness of 100 μm.

In addition, with the twin-screw extruder, 70 parts of polypropylene [trade name "SUNALLOMER PC684S", manufactured by SunAllomer Ltd.], 25 parts of carbon black [trade name "DENKA BLACK (specific surface area: 69 $m^2/g$)" (manufactured by Denka Company Limited], and 5 parts of a dispersant [trade name "UMEX 1001", manufactured by Sanyo Chemical Industries, Ltd.] were melted and kneaded under conditions of 180° C., 100 rpm, and a residence time of 5 minutes to obtain a resin current collector material for a negative electrode. The obtained resin current collector material for a negative electrode was rolled with a hot press, thereby obtaining a conductive layer (N1-2) having a film thickness of 100 μm.

The conductive layer (N1-1) and the conductive layer (N1-2) were overlapped and pressure-bonded with a hot press, thereby obtaining a negative electrode current collector (N1) having a film thickness of 100 μm.

Manufacturing Example 5: Manufacturing of Negative Electrode Current Collector (N2)

The same operation as in Manufacturing Example 4 and the manufacturing of the conductive layer (N1-2) was performed except that, in Manufacturing Example 4 and the manufacturing method of the conductive layer (N1-2), the carbon black was changed to trade name "#3030 (specific surface area: 32 $m^2/g$)" (manufactured by Mitsubishi Chemical Corporation), thereby obtaining a conductive layer (N2-2) having a film thickness of 100 μm.

The conductive layer (N1-1) and the conductive layer (N2-2) were overlapped and pressure-bonded with a hot press, and a copper metal layer was formed on the conductive layer (N1-1) side of an obtained current collector by a vacuum vapor deposition method in a thickness of 40 nm, thereby obtaining a negative electrode current collector (N2) having a film thickness of 100 μm and having the metal layer provided on one surface.

Manufacturing Example 6: Manufacturing of Negative Electrode Current Collector (N3)

The conductive layer (N1-1) and the conductive layer (N2-2) were overlapped and pressure-bonded with a hot press, thereby obtaining a negative electrode current collector (N3) having a film thickness of 100 μm.

Manufacturing Example 7: Manufacturing of Negative Electrode Current Collector (N4)

The conductive layer (N1-1) was used as it was as a negative electrode current collector (N4).

<Measurement of Electric Resistance Value (Feedthrough Resistance Value) in Thickness Direction of Current Collector>

The positive electrode current collectors (P1) to (P3) and the negative electrode current collectors (N1) to (N4) were cut into approximately 3 cm×10 cm strips, respectively, and the feedthrough resistance values of the respective positive electrode current collectors and the respective negative electrode current collectors were measured using an electric resistance measuring instrument [IMC-0240 type, manufactured by Imoto machinery Co., Ltd.] and a resistance meter [RM3548, manufactured by HIOKI E.E. Corporation].

The resistance values of the resin current collectors with a load of 2.16 kg applied to the electric resistance measuring instrument were measured, and the values after 60 seconds from the application of the load of 2.16 kg were regarded as the resistance values of the resin current collectors. As shown in the following formula, values obtained by multiplying the area of the contact surface of a jig at the time of resistance measurement (3.14 $cm^2$) were regarded as the feedthrough resistance values ($\Omega \cdot cm^2$). The results are shown in Table 1 and Table 2.

Feedthrough resistance value ($\Omega \cdot cm^2$)=resistance value ($\Omega$)×3.14 ($cm^2$)

TABLE 1

| Positive electrode current collector | | Resin (A1) | Conductive carbon filler (B1) | Feedthrough resistance value ($\Omega \cdot cm^2$) |
|---|---|---|---|---|
| Manufacturing Example 1 | P1 | PC684S | ENSACO 250G | 11.7 |
| Manufacturing Example 2 | P2 | PC684S | #3030 | 16.7 |
| Manufacturing Example 3 | P3 | PC684S | DENKA BLACK | 6.0 |

TABLE 2

| Negative electrode current collector | | Conductive layer 1 | | Conductive layer 2 | | Feedthrough resistance value ($\Omega \cdot cm^2$) |
|---|---|---|---|---|---|---|
| | | Resin | Conductive filler | Resin (A1) | Conductive carbon filler (B1) | |
| Manufacturing Example 4 | N1 | PC684S | Type255 | PC684S | DENKA BLACK | 3.9 |
| Manufacturing Example 5 | N2 | PC684S | Type255 | PC684S | #3030 | 1.3 |
| Manufacturing Example 6 | N3 | PC684S | Type255 | PC684S | #3030 | 7.5 |
| Manufacturing Example 7 | N4 | PC684S | Type255 | — | — | 2.0 |

<Preparation of Electrolytic Solution>

LiN(FSO$_2$)$_2$ was dissolved in a solvent mixture of ethylene carbonate (EC) and propylene carbonate (PC) (at a volume ratio of 1:1) in a proportion of 1 mol/L, thereby producing an electrolytic solution.

<Production of Negative Electrode Active Material Slurry>

63 Parts of non-graphitizable carbon particles [CARBOTRON (registered trademark) manufactured by Kureha Battery Materials Japan Co., Ltd., volume average particle diameter: 25 μm] and 1 part of a carbon fiber, which was a conductive material, [DONACARBO MILLED S-243 manufactured by Osaka Gas Chemicals Co., Ltd.] were added to 36 parts of the electrolytic solution and then mixed using a planetary stirring type mixing and kneading device {Awatori Rentaro [manufactured by Thinky Corporation]} at 2000 rpm for 1.5 minutes, thereby producing a negative electrode active material slurry.

<Production of Positive Electrode Active Material Slurry>

1 Part of a conductive carbon filler [trade name: DENKA BLACK, manufactured by Denka Company Limited] and 57 parts of LiNi$_{0.8}$Co$_{0.15}$Al$_{0.05}$O$_2$ powder as positive electrode active material particles were mixed with 42 parts of the electrolytic solution, thereby producing a positive electrode active material slurry.

<Manufacturing of Separator Main Body>

A flat plate-like CELGARD 2500 (made of PP, thickness: 25 μm) was cut into a 14 mm×14 mm square shape and used as a separator main body.

<Production of Frame-Like Member>

Adhesive polyolefin-based resin films that served as sealing layers [manufactured by Mitsui Fine Chemicals, Inc Co., Ltd., ADMER VE300, thickness: 50 μm] were overlapped on both surfaces of a polyethylene naphthalate film that served as a heat-resistant annular support member [PEN film manufactured by Teijin Limited, TEONEX Q51, thickness: 250 μm], and the heat-resistant annular support member and the sealing layers were caused to adhere to one another with a heating roll, thereby preparing a laminate. After that, the laminate was cut into a 15 mm×15 mm square shape, and furthermore, an 11 mm×11 mm central region was blanked, thereby obtaining an annular laminate (frame-like member) in which the heat-resistant annular support member made of PEN (PEN layer) and the sealing layers were laminated and the widths of the four sides of the square shape were 2 mm.

<Joining of Separator Main Body and Frame-Like Member>

The frame-like member was overlapped on one surface of the separator main body such that the center of gravity of the frame-like member based on the outside dimensions and the center of gravity of the separator main body based on the outside dimensions overlapped each other and one sealing layer (regarded as a second sealing layer) of the frame-like member came into contact with the separator main body, and the frame-like member was heated with an impulse sealer to be melted and caused to adhere to the separator main body, thereby obtaining a separator for a lithium-ion battery in which the frame-like member was disposed on one surface in an annular shape along the outer periphery of the separator main body.

Example 1

The positive electrode active material slurry was applied to one surface of the positive electrode current collector (P1) to produce a positive electrode active material layer having a thickness of 300 μm. Similarly, the negative electrode active material slurry was applied to the conductive layer (N1-1) side of the negative electrode current collector (N1) to produce a negative electrode active material layer having a thickness of 300 μm. The separator disposed on the frame-like member was overlapped on the positive electrode active material layer with the surface on which the positive electrode active material layer was formed facing upward. After that, the separator disposed on the frame-like member was turned over and overlapped on the negative electrode active material layer. Three sides of the sealing layers of the frame-like member (portions where the frame-like member and the positive electrode current collector or the negative electrode current collector were in contact with each other) were heat-sealed, and the remaining sides were vacuum-sealed to adhere to each other, thereby obtaining a lithium-ion single cell.

Two of the obtained single cells were laminated such that the positive electrode current collector of one single cell and the negative electrode current collector of the other single cell overlapped each other, the laminate was sandwiched with two commercially available heat fusion-type aluminum-laminated films, three sides of the outer peripheries of the aluminum-laminated films were heat-sealed, and the remaining sides were vacuum-sealed to adhere to each other, thereby obtaining a lithium-ion assembled battery according to Example 1.

Examples 2 and 3 and Comparative Examples 1 to 5

Lithium-ion single cells and assembled batteries of Examples 2 and 3 and Comparative Examples 1 to 5 were obtained by changing the combination of the positive electrode current collector and the negative electrode current collector of Example 1 as shown in Table 3.

<Measurement of Electric Resistance Values (Feedthrough Resistance Values) in Thickness Direction of Laminates of Positive Electrode Current Collector and Negative Electrode Current Collector>

For the laminates of the positive electrode current collector and the negative electrode current collector according to the combinations shown in Table 3, the electric resistance values (feedthrough resistance values) were measured in the same manner as in the above-described method. The results are shown in Table 3.

<Evaluation of Lithium-Ion Single Cells and Assembled Batteries>

The lithium-ion single cells and the assembled batteries produced in the respective examples and the respective comparative examples were fully discharged and then charged, and the SOCs were adjusted to 50% by confirming the voltages. After that, the lithium-ion single cells and the assembled batteries were discharged at 0.1C for 10 seconds. The DC resistance values were measured from the 0.1C-equivalent current values $I_{0.1C}$ and the voltage changes $\Delta V_{0.1C}$ between the voltage after charging and the voltage after discharging. The resistances ($\Omega$) can be calculated from the measurement results according to Ohm's law. The area resistances ($\Omega \cdot cm^2$) were calculated by multiplying the resistance by the electrode area (the area of the positive electrode active material layer). The results are shown in Table 3.

INDUSTRIAL APPLICABILITY

The lithium-ion assembled battery of the present invention is useful as a lithium-ion battery that is used particularly for mobile phones, personal computers, hybrid vehicles, and electric vehicles.

REFERENCE SIGNS LIST

1 Lithium-ion assembled battery
10 First single cell
11, 21 Positive electrode current collector
12, 22 Positive electrode active material layer
13, 23 Separator
14, 24 Negative electrode active material layer
15, 25 Negative electrode current collector
15a, 25a Conductive layer disposed on inner side
15b, 25b Conductive layer disposed on outer side
20 Second single cell

The invention claimed is:
1. A lithium-ion assembled battery comprising:
two or more single cells including a laminating unit in which a positive electrode current collector, a positive electrode active material layer, a separator, a negative electrode active material layer, and a negative electrode current collector are laminated in order,
wherein, in the assembled battery, one single cell and the other single cell are laminated such that the positive electrode current collector of the one single cell and the negative electrode current collector of the other single cell are in contact with each other,
the positive electrode current collector is made up of a conductive resin layer containing a polyolefin resin (A1) and a conductive carbon filler (B1),
the negative electrode current collector is made up of two or more kinds of conductive layers, and
the conductive layer disposed on an outer side among the conductive layers in the negative electrode current collector contains the polyolefin resin (A1) and the conductive carbon filler (B1)
the conductive layer disposed on an inner side among the conductive layers in the negative electrode current collector contains the polyolefin resin (A1), and one or more kinds selected from the group consisting of nickel, aluminum, stainless steel, silver, copper and titanium.

TABLE 3

| | Positive electrode current collector | Negative electrode current collector | Feedthrough resistance of laminate of positive electrode current collector and negative electrode current collector ($\Omega \cdot cm^2$) | DC resistance value of single cell ($\Omega \cdot cm^2$) | DC resistance value of assembled battery ($\Omega \cdot cm^2$) |
|---|---|---|---|---|---|
| Example 1 | P2 | N2 | 11.4 | 12.4 | 28.2 |
| Example 2 | P2 | N3 | 16.8 | 13.7 | 27.9 |
| Example 3 | P3 | N1 | 8.8 | 10.5 | 26.3 |
| Comparative Example 1 | P2 | N1 | 25.7 | 13.7 | 36.2 |
| Comparative Example 2 | P2 | N4 | 23.1 | 17.5 | 55.0 |
| Comparative Example 3 | P3 | N4 | 16.8 | 13.5 | 45.0 |
| Comparative Example 4 | P1 | N1 | 25.8 | 13.2 | 31.3 |
| Comparative Example 5 | P1 | N4 | 24.6 | 15.2 | 39.1 |

2. The lithium-ion assembled battery according to claim 1,
wherein the conductive carbon filler (B1) has a specific surface area of 10 to 35 m²/g.

3. The lithium-ion assembled battery according to claim 1,
wherein the conductive carbon filler (B1) has a specific surface area of 10 to 69 m²/g.

4. A method of manufacturing the lithium-ion assembled battery according to claim 1, comprising:
laminating one single cell and the other single cell such that the positive electrode current collector of the one single cell and the negative electrode current collector of the other single cell are in contact with each other,
wherein the positive electrode current collector is made up of a conductive resin layer containing a polyolefin resin (A1) and a conductive carbon filler (B1),
the negative electrode current collector is made up of two or more kinds of conductive layers, and
the conductive layer disposed on an outer side among the conductive layers in the negative electrode current collector contains the polyolefin resin (A1) and the conductive carbon filler (B1).

\* \* \* \* \*